(12) United States Patent
Kaplita et al.

(10) Patent No.: US 10,986,227 B2
(45) Date of Patent: Apr. 20, 2021

(54) SYSTEM, DEVICE AND METHOD FOR BALANCING HUMAN RESOURCE USAGE AT A PLURALITY OF COMPUTING TERMINALS

(71) Applicant: MOTOROLA SOLUTIONS, INC., Chicago, IL (US)

(72) Inventors: Grzegorz Kaplita, Rzeszow (PL); Pawel Kaspercyzk, Dobczyce (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/767,492

(22) PCT Filed: Dec. 20, 2017

(86) PCT No.: PCT/PL2017/050063
§ 371 (c)(1),
(2) Date: May 27, 2020

(87) PCT Pub. No.: WO2019/125192
PCT Pub. Date: Jun. 27, 2019

(65) Prior Publication Data
US 2020/0412873 A1 Dec. 31, 2020

(51) Int. Cl.
*H04M 3/51* (2006.01)
*H04M 11/04* (2006.01)
(Continued)

(52) U.S. Cl.
CPC ..... *H04M 3/5116* (2013.01); *G06Q 10/06311* (2013.01); *G06Q 10/06315* (2013.01); *G06Q 50/26* (2013.01); *H04M 3/5238* (2013.01)

(58) Field of Classification Search
None
See application file for complete search history.

(56) References Cited

U.S. PATENT DOCUMENTS

| 5,185,780 A * | 2/1993 | Leggett .................. G06Q 10/06 379/265.08 |
| 5,289,368 A | 2/1994 | Jordan et al. |

(Continued)

FOREIGN PATENT DOCUMENTS

| EP | 1056264 A2 | 11/2000 |
| EP | 1296502 A2 | 3/2003 |

OTHER PUBLICATIONS

Alecu, Mihail, International Search Report, dated Sep. 21, 2018, issued in corresponding PCT application PCT/PL2017/050063, filed Dec. 20, 2017, Entitled; System, Device and Method for Balancing Human Resource Usage at a Plurality of Computing Terminals.

*Primary Examiner* — Quoc D Tran
(74) *Attorney, Agent, or Firm* — Perry + Currier, Inc.

(57) ABSTRACT

A system, device and method for balancing resource usage at a plurality of computing terminals is provided. Predicted dispatcher workload is generated for one or more of channels and talkgroups, based on crime analysis data for one or more of regions and first responders associated with the one or more of the channels and the talkgroups. Subsets of the one or more of the channels and the talkgroups are assigned to the plurality of dispatcher terminals based at least on the predicted dispatcher workload for the one or more of the channels and the talkgroups and respective dispatcher profiles. Communications at each of the plurality of dispatcher terminals are controlled based on the assigning of the subsets of the one or more of the channels and the talkgroups to the plurality of dispatcher terminals.

20 Claims, 10 Drawing Sheets

(51) Int. Cl.
*H04M 3/523* (2006.01)
*G06Q 50/26* (2012.01)
*G06Q 10/06* (2012.01)

(56) References Cited

U.S. PATENT DOCUMENTS

| | | | |
|---|---|---|---|
| 6,295,491 | B1 | 9/2001 | Ayoub et al. |
| 6,859,523 | B1* | 2/2005 | Jilk ................ G06Q 10/06 379/32.01 |
| 6,920,114 | B2 | 7/2005 | McDonald et al. |
| 10,062,042 | B1* | 8/2018 | Kelly ............ G06Q 10/063116 |
| 10,178,516 | B1* | 1/2019 | Falvai ................ H04L 12/1895 |
| 2009/0054029 | A1* | 2/2009 | Hogberg ............ H04L 41/5006 455/404.2 |
| 2009/0284348 | A1* | 11/2009 | Pfeffer ................ H04W 76/50 340/7.3 |
| 2015/0286982 | A1* | 10/2015 | Dwyer ............ G06Q 10/063118 705/7.17 |
| 2016/0155080 | A1* | 6/2016 | Gnanasambandam ................ H04M 3/5175 379/265.03 |
| 2017/0098181 | A1 | 4/2017 | Herman |
| 2017/0278378 | A1* | 9/2017 | Kaplita ................ H04W 4/90 |
| 2018/0024868 | A1* | 1/2018 | Mehta ................ G06F 16/24569 718/104 |
| 2018/0330600 | A1* | 11/2018 | Polyakov ............ G08B 25/004 |
| 2019/0156646 | A1* | 5/2019 | Richey ................ G08G 1/205 |
| 2019/0378397 | A1* | 12/2019 | Williams, II ........ G08B 25/005 |

* cited by examiner

SYSTEM, DEVICE AND METHOD FOR BALANCING HUMAN RESOURCE USAGE AT A PLURALITY OF COMPUTING TERMINALS

BACKGROUND OF THE INVENTION

In a dispatch center, for example a command center and/or an emergency dispatch center, computing terminals (also referred to as dispatcher terminals) are used to communicate with remote communication devices using channels and/or talkgroups. Balancing use of processing resources and communication resources at each terminal may be important.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
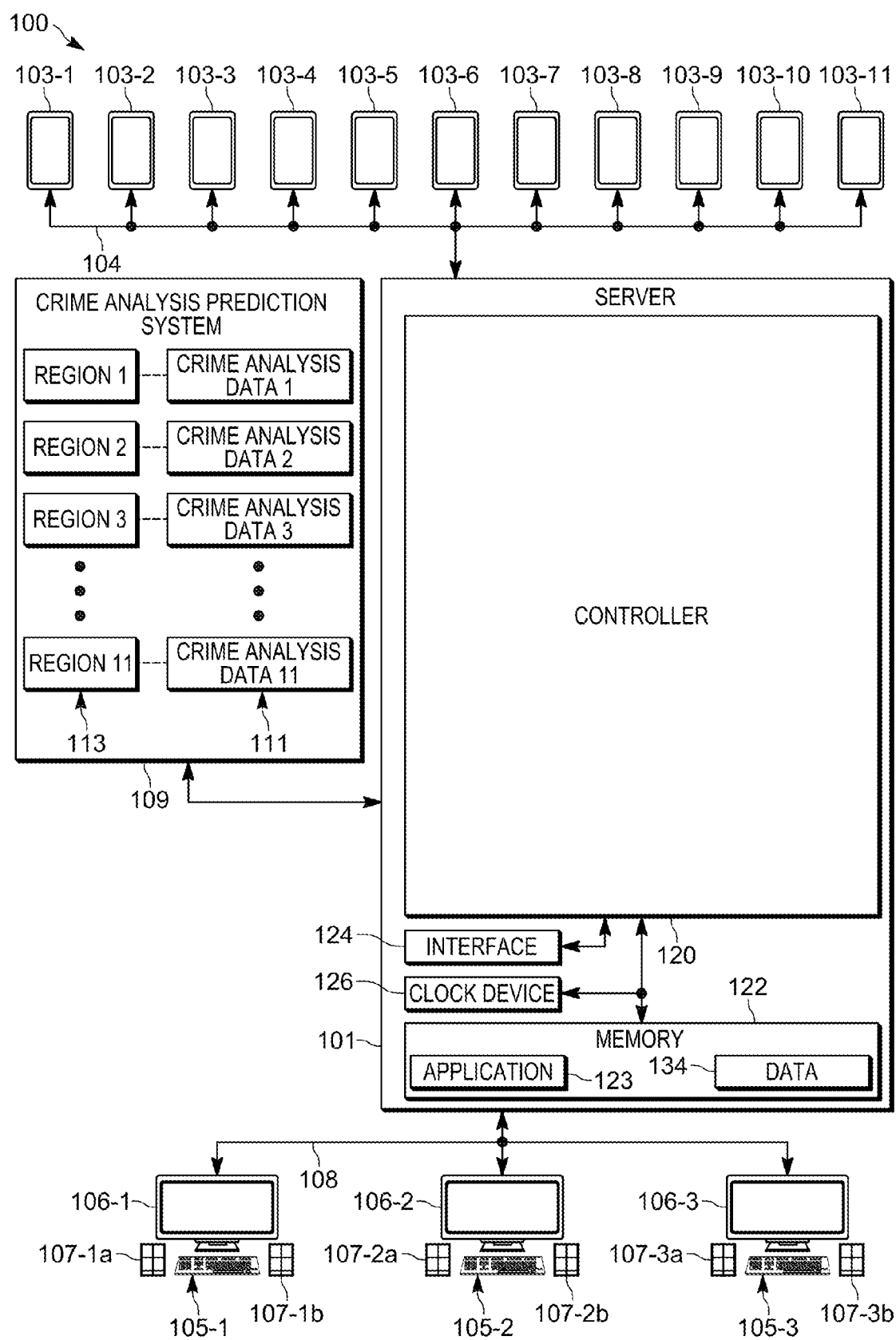
FIG. 1 depicts a system that includes a server for balancing resource usage at a plurality of computing terminals in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In a dispatch center, for example a command center and/or an emergency dispatch center, computing terminals (also referred to as dispatcher terminals) are used to communicate with remote communication devices using channels and/or talkgroups. Balancing use of processing resources and communication resources at each dispatch terminal may be important. For example, dispatcher terminals may be used to communicate with the remote communication devices using multiple talkgroups and/or channels. However, resources associated with talkgroups and/or channels may be difficult to predict. When resources are not balanced between the dispatch terminals, a first dispatch terminal may be overwhelmed with communications from the remote communication devices while other dispatch terminals may be in a waiting mode. Such unbalanced resource allocation may result in a dispatcher at the first dispatch terminal being overwhelmed, while dispatchers at the other dispatch terminals may be waiting, which is also a waste of human resources. When the dispatch center is a public safety dispatch center, even one dispatcher being overwhelmed may lead to complications at public safety incidents, which may include complications of life and death situations. Complicating the problem may be the use of "dynamically created talkgroups" and/or "ad-hoc talkgroups" sometimes used by public safety organizations in which many talkgroups and/or communication devices dynamically come on-line whenever, for example, a first responder activates a push-to-talk key at a communication device; use of such dynamically created talkgroups may result in creation of larger numbers of talkgroups which may cause problems with assigning their management and distribution among dispatcher terminals.

An aspect of the specification provides a method for controlling communications at a plurality of dispatcher terminals in communication with a computing device, the method comprising: generating, at the computing device, a predicted dispatcher workload for one or more of channels and talkgroups, the predicted dispatcher workload based on crime analysis data for one or more of regions and first responders associated with the one or more of the channels and the talkgroups, the crime analysis data received from a crime prediction system; assigning, at the computing device, subsets of the one or more of the channels and the talkgroups to the plurality of dispatcher terminals based at least on the predicted dispatcher workload for the one or more of the channels and the talkgroups and respective dispatcher profiles; and controlling, at the computing device, communications at each of the plurality of dispatcher terminals based on the assigning of the subsets of the one or more of the channels and the talkgroups to the plurality of dispatcher terminals.

Another aspect of the specification provides a computing device for controlling communications at a plurality of dispatcher terminals, the computing device comprising: a controller, and a communication interface configured for communication with the plurality of dispatcher terminals and a crime prediction system, the controller configured to: generate a predicted dispatcher workload for one or more of channels and talkgroups, the predicted dispatcher workload based on crime analysis data for one or more of regions and first responders associated with the one or more of the channels and the talkgroups, the crime analysis data received from the crime prediction system; assign subsets of the one or more of the channels and the talkgroups to the plurality of dispatcher terminals based at least on the predicted dispatcher workload for the one or more of the channels and the talkgroups and respective dispatcher profiles; and control communications at each of the plurality of dispatcher terminals based on assigning of the subsets of the one or more of the channels and the talkgroups to the plurality of dispatcher terminals.

FIG. 1 is a block diagram of a system 100 that includes a server 101 in communication with one or more communication devices 103-1, 103-2 . . . 103-11 and a plurality of dispatcher terminals 105-1, 105-2 . . . 105-3 using, for example, respective communication links 104 to each of the one or more communication devices 103-1, 103-2 . . . 103-11 and respective communication links 108 to the plurality of dispatcher terminals 105-1, 105-2 . . . 105-3.

Each of the plurality of dispatcher terminals 105-1, 105-2 . . . 105-3 is associated with a respective display devices 106-1, 106-2 . . . 106-3 and respective speaker devices, for example respective pairs of speaker devices 107-1a, 107-1b, 107-2a, 107-2b, 107-3a, 107-3b. Each of the plurality of dispatcher terminals 105-1, 105-2 . . . 105-3 is further associated with one or more respective input devices, as depicted a respective keyboard. Each of the plurality of dispatcher terminals 105-1, 105-2 . . . 105-3 may be further associated with one or more respective microphones (not depicted), for example at a headset and the like.

The one or more communication devices 103-1, 103-2 . . . 103-11 will be interchangeably referred to hereafter, collectively, as the devices 103, and generically as a device 103. Similarly, the plurality of dispatcher terminals 105-1, 105-2 . . . 105-3 will be interchangeably referred to hereafter, collectively, as the dispatcher terminals 105, and generically as a dispatcher terminal 105. Similarly, the display devices 106-1, 106-2 . . . 106-3 will be interchangeably referred to hereafter, collectively, as the display devices 106, and generically as a display device 106. Similarly, the speaker devices 107-1a, 107-1b, 107-2a, 107-2b, 107-3a, 107-3b will be interchangeably referred to hereafter, collectively, as the speaker devices 107, and generically as a speaker device 107.

The server 101 generally controls communications and/or resources at each of the dispatcher terminals 105 using the links 108, for example by controlling communications between the dispatcher terminals and the devices 103, controlling the display devices 106, controlling the speaker devices 107 and the like.

In specific embodiments, the system 100 comprises components of a dispatch center and/or a command center and/or a computer aided dispatch, including, but not limited to, an emergency dispatch center used to communicate with first responders and/or emergency responders operating the devices 103, and the server 101 comprises one or more server devices and/or one or more communication devices and/or one or more computing devices which balances resource usage at the dispatcher terminals 105.

In general, each of the dispatcher terminals 105 used by one or more operators, referred to as "dispatchers" which interact with the display devices 106 using the respective input devices, for example to communicate with one or more of the devices 103 using channels, talkgroups and the like, using a respective microphone and the respective speaker devices 107. In general, the server 101 assigns channels and/or talkgroups to each of the dispatcher terminals 105, as described below. Such communications with one or more of the devices 103 using channels, talkgroups and the like may include, but are not limited to, communications and/or emergency communications between the dispatcher terminals 105 and the devices 103, dispatching the emergency responders associated with the devices 103, transmitting data and/or multimedia data, and the like. The dispatch terminals 105 may alternatively be referred to as dispatch consoles. In some embodiments, one or more of the dispatch terminals 105 may be portable and used external to a dispatch center, and the like.

While in the present example, eleven of the devices 103 are depicted, a number of the devices 103 may include as few as one device 103, but may include tens, hundreds and even thousands of devices 103 depending, for example, on a number of first responders and/or emergency responders being managed within the system 100. Furthermore, the devices 103 and/or channels associated with the devices 103 may be organized into talkgroups and each of the dispatcher terminals 105 may communicate with a plurality of the device 103 and/or a plurality of the talkgroups and/or a plurality of channels.

In some embodiments, as depicted, one or more of the devices 103 generally comprises a mobile device which includes, but is not limited to, any suitable combination of electronic devices, communication devices, computing devices, portable electronic devices, mobile computing devices, portable computing devices, tablet computing devices, telephones, PDAs (personal digital assistants), cellphones, smartphones, e-readers, mobile camera devices, wearable devices, smartwatches, smart glasses, heads-up devices, headset and the like. However, other suitable devices are within the scope of present embodiments including non-mobile radios and non-mobile communication devices.

Furthermore, one or more of the devices 103 may be incorporated into vehicles, and the like (for example emergency service vehicles), as a radio, an emergency radio, and the like.

Indeed, in some embodiments, one or more of the devices 103 are specifically adapted for emergency service radio functionality, and the like, used by emergency responders and/or emergency responders, including, but not limited to, police service responders, fire service responders, emergency medical service responders, and the like. In some of these embodiments, the devices 103 further includes other types of hardware for emergency service radio functionality, including, but not limited to, push-to-talk ("PTT") functionality.

While in the present example, three of the dispatcher terminals 105 are depicted, a number of the dispatcher terminals 105, but may include tens and even hundreds (or more) of the dispatcher terminals 105 depending, for example, on a size of the dispatch center and/or computer aided dispatch, and/or on a number of operators and/or dispatchers and/or dispatcher terminals for which the system 100 is configured. In the present example, it will be assumed that one dispatcher is interacting with, and/or assigned to, and/or is associated with, one of the dispatcher terminals 105, however a dispatcher may be interacting with, and/or assigned to, and/or is associated with, more than one of the dispatcher terminals 105.

As depicted, each of the dispatcher terminals 105 comprises a display device 106, and a pair of speaker devices 107 and is in communication with the server 101 via a communication link 104. Hence, while not depicted, each of the dispatcher terminals 105 further comprises a computing device and a communication interface for communicating with the server 101. However, in general, each of the dispatcher terminals generally comprise a client device in a client-server environment, with the computing device at each dispatcher terminal 105 executing a thin-client device application, and the like. Hence, in general, the display devices 106 and the speaker devices 107 are generally controlled by the server 101.

Each of the one or more display devices 106 comprises one or more of a cathode ray tube, a flat panel display, a liquid crystal display, an organic light emitting display, and the like. In some embodiments, one or more of the display devices 106 include a touch screen device and the like. While in the present example, only one display device 106 is depicted for each of the dispatcher terminals 105, a dispatcher terminal 105 include more than one display device 106.

Each of the speaker devices 107 comprises any suitable speaker device configured for use by a respective dispatcher at a dispatcher terminal 105. Each pair of speaker devices 107 may comprise desktop-style speakers, headphones, or a combination thereof. Furthermore, while a pair of speaker devices 107 is depicted for each of the dispatcher terminals 105, each of the dispatcher terminals 105 may include as few as one speaker device 107. Furthermore, each speaker device 107, of a pair of speaker devices 107, may be controlled by the server 101 to provide different sound output. For example, a first speaker device 107, of a pair of speaker devices 107 may output sound from all channels and/or talkgroups assigned to a respective dispatcher terminal 105, while a second speaker device 107, of a pair of speaker devices 107 may output sound from selected channels and/or talkgroups assigned to a respective dispatcher terminal 105.

Attention is next directed to the server 101 which comprises: a controller 120, a memory 122, storing an application 123, a communication interface 124, interchangeably referred to hereafter as the interface 124, and a clock device 126. The controller 120 is generally configured for communication with at least the plurality of dispatcher terminals 105, including the display devices 106 and the speaker devices 107, as well as input devices, microphones, computing devices, communication interfaces, etc., using the interface 124. The controller 120 may be generally configured to also communicate with the devices 103, for example using the interface 124.

As depicted, the memory 122 further stores data 134 used by the server 101 and/or the controller 120 to assign subsets of one or more of channels and talkgroups to the plurality of dispatcher terminals 105 as described in more detail below. The data 134 will be described in more detail below with respect to FIG. 3. However, in some embodiments, the data 134 may be at least partially stored at another memory accessible to the controller 120 (e.g. at another server and/or another device), and the controller 120 is in communication with the other memory, and the data 134 stored at the other memory may be retrieved from the other memory upon request by the controller 120.

The controller 120 includes one or more logic circuits, one or more processors, one or more microprocessors, one or more ASIC (application-specific integrated circuits) and one or more FPGA (field-programmable gate arrays). In some embodiments, the controller 120 and/or the server 101 is not a generic controller and/or a generic device and/or a generic server, but a device specifically configured to implement functionality for balancing resource usage at a plurality of computing terminals and in particular the dispatcher terminals 105. For example, in some embodiments, the server 101 and/or the controller 120 specifically comprises a computer executable engine configured to implement specific functionality for balancing resource usage at a plurality of computing terminals and in particular the dispatcher terminals 105.

The memory 122 comprises a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 1, programming instructions (e.g., machine readable instructions) that implement the functional teachings of the server 101 as described herein are maintained, persistently, at the memory 122 and used by the controller 120 which makes appropriate utilization of volatile storage during the execution of such programming instructions.

In particular, the memory 122 of FIG. 1 stores instructions corresponding to the application 123 that, when executed by the controller 120, enables the controller 120 to implement secure message thread communication functionality associated with the application 123. In the illustrated example, when the controller 120 executes the application 123, the controller 120 is enabled to: generate a predicted dispatcher workload for one or more of channels and talkgroups, the predicted dispatcher workload based on crime analysis data for one or more of regions and first responders associated with of one or more of the channels and the talkgroups, the crime analysis data received from a crime prediction system; assign subsets of the one or more of the channels and the talkgroups to the plurality of dispatcher terminals 105 based at least on the predicted dispatcher workload for one or more of the channels and the talkgroups and respective dispatcher profiles; and control communications at each of the plurality of dispatcher terminals 105 based on the assigning of the subsets of one or more of the channels and the talkgroups to the plurality of dispatcher terminals 105.

The interface 124 is generally configured to communicate with the plurality of devices 103 and the plurality of dispatcher terminals 105 using wired and/or wired links 104, 08 as desired, including, but not limited to, cables, WiFi links and the like. In other words, the links 104, 108 may include any suitable combination of wired networks and/or wireless networks.

The interface 124 is generally configured to communicate with the plurality of devices 103 and the plurality of dispatcher terminals 105, for example, using one or more communication channels over the links 104, 108. In these embodiments, the interface is implemented by, for example, one or more radios and/or connectors and/or network adaptors, configured to communicate wirelessly, with network architecture that is used to implement one or more communication channels between the server 101, the devices 103 and the dispatcher terminals 105 and/or a wireless network. Indeed, the server 101 and the interface 124 generally facilitate communication between the devices 103 and the dispatcher terminals 105 using communication channels. In these embodiments, the interface 124 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 802.16 standard, and/or other similar type of wireless transceiver configurable to communicate via a wireless network for infrastructure communications.

In yet further embodiments, the interface 124 includes one or more local area network or personal area network transceivers operating in accordance with an IEEE 802.11 standard (e.g., 802.11a, 802.11b, 802.11g), or a Bluetooth™ transceiver which may be used to communicate with the devices 103 and/or the dispatcher terminals 105. In some embodiments, the interface 124 is further configured to communicate "radio-to-radio" on some communication channels (e.g. in embodiments where the interface 124 includes a radio), while other communication channels are configured to use wireless network infrastructure.

Example communication channels over which the interface 124 may be generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination.

However, in other embodiments, the interface 124 communicates with the one or more devices 103 using other servers and/or communication devices, for example by communicating with the other servers and/or communication devices using, for example, packet-based and/or internet protocol communications, and the like, and the other servers and/or communication devices use radio communications to wirelessly communicate with the one or more devices 103. Such communication is, in present embodiments, nonetheless channel-based.

Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like. Indeed, groups of channels may be logically organized into talkgroups, and/or dynamically allocated into talkgroups, though channels in a talkgroup may be dynamic as the traffic (e.g. communications) in a talkgroup may increase or decrease, and channels assigned to the talkgroup may be adjusted accordingly.

However, the interface 124 may communicates with the one or more devices 103 using one-on-one calls, private calls and/or group calls, and the like.

The clock device 126 generally comprises a clock that may be a distinct component of the server 101 (as depicted) and/or a component of the controller 120, for example a timing clock of a processor of the controller 120, and the like. Alternatively, the clock device 126 may be external and/or remote from the server 101, and accessible to the controller 120 via the interface 124. The clock device 126 generally provides a current time and/or date to the controller 120, periodically, on demand, and the like.

In any event, it should be understood that a wide variety of configurations for the server 101 are within the scope of present embodiments.

As will be described below with respect to FIG. 2, each of the devices 103 maybe assigned to a respective first responder, such as police officer, and the like, and each of the respective first responders may be assigned to a different region, for example regions of a city, to patrol their respective regions and deal with incidents in the region as they arise and/or as they are assigned to a first responder using the server 101 and a respective device 103. In the present example embodiment, it will be assumed that there are eleven regions, and that one first responder is assigned to one region, along with a respective device 103. Hence, as there are eleven devices 103 and eleven regions, as described below with respect to FIG. 2, the devices 103 are assigned to each of the regions on a one-to-one basis.

As depicted, the system 100 further comprises a crime prediction system 109 in communication with the server 101. The crime prediction system 109 may be a component of the server 101 and/or (as depicted) be separate from and/or remote from the server 101. The crime prediction system 109 is generally configured to produce crime analysis data 111 for a plurality of regions, identified in FIG. 1 by region identifiers 113.

While details of the crime prediction system 109 are not depicted, the crime prediction system 109 may have a similar structure as the server 101; hence the crime prediction system 109 generally comprises a controller that generates the crime analysis data 111, a memory storing the crime analysis data 111 and the region identifiers 113 and a communication interface for communicating with the server 101.

When the crime prediction system 109 is component of the server 101, the crime analysis data 111 and the region identifiers 113 may be stored at the memory 122, and the controller 120 may generate the crime analysis data 111.

While the regions identifiers 113 are depicted as separate from the crime analysis data 111, the region identifiers 113 are generally a component of the crime analysis data 111. As there are eleven regions for which crime analysis data 111 is being generated, each set of crime analysis data 111 is numbered from "Crime Analysis Data 1" to "Crime Analysis Data 11", for each of the eleven regions; similarly, each of the regions identifiers 113 is numbered from "Region 1" to "Region 11".

Figure 2:
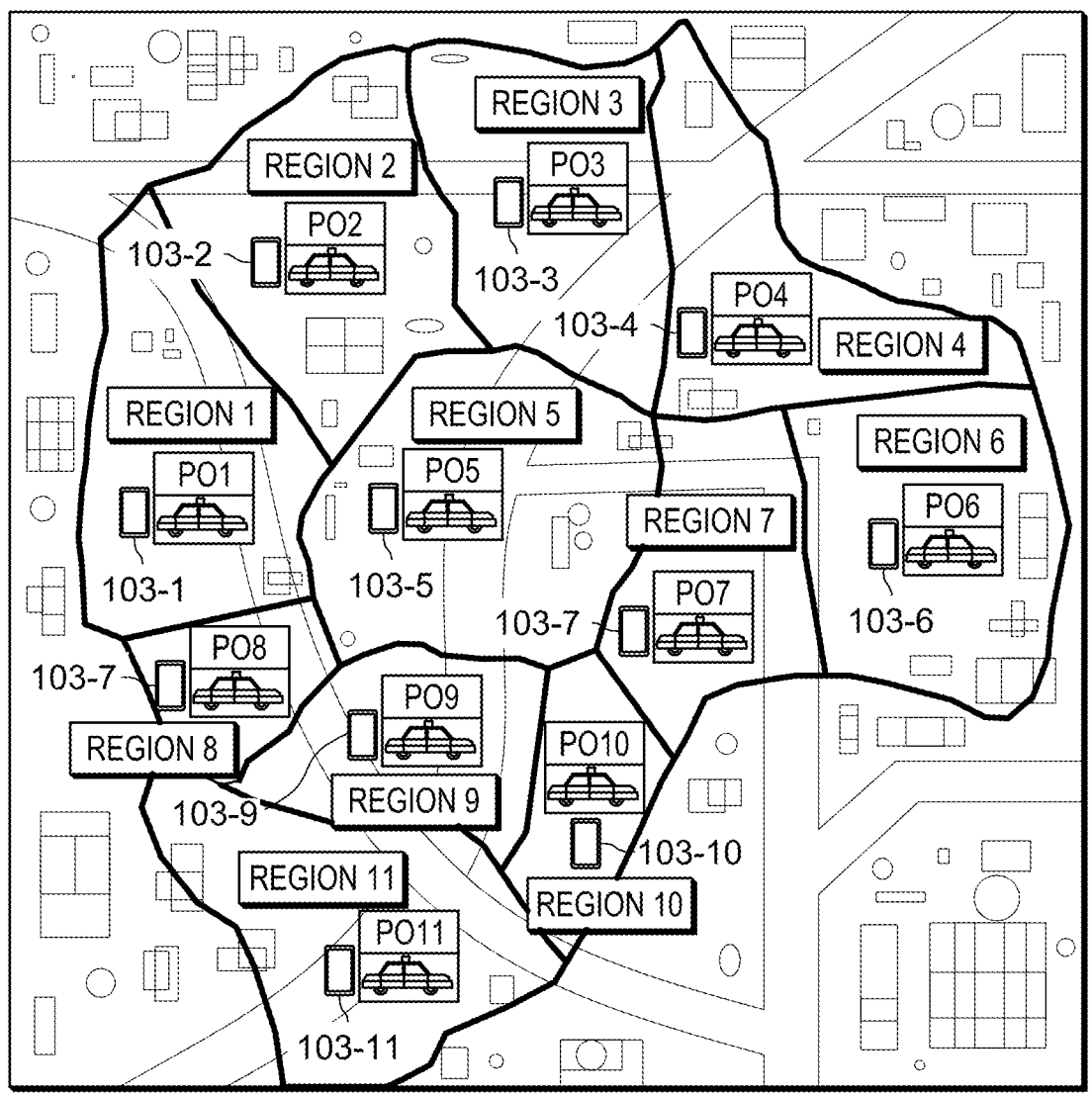
FIG. 2 depicts a map showing a plurality of regions and assignments of first responders and associated communications devices to the plurality of regions in accordance with some embodiments.

For example, attention is directed to FIG. 2 which depicts a map 200 of the regions identified by the region identifiers 113, also numbered "1" to "11" on the map 200. For example, the map 200 comprises a map of a city divided into eleven example regions which may be similar in size, and/or, as depicted, different in size. A first responder is assigned to each of the eleven regions, each of the first responders identified by a corresponding identifier P01, P02, P03 . . . P011. As depicted schematically in FIG. 2, each of the first responders are in a corresponding vehicle, and using the vehicle to patrol an associated region and/or respond to incidents in the associated region. As depicted, each of the first responders is associated with a respective device 103 (e.g. the first responder identified by the identifier P01 is assigned device 103-1, etc.). Hence each of the first responders may communicate with the dispatch terminals 105 using a respective device 103. Furthermore, the server 101 manages communications therebetween.

Returning to FIG. 1, the crime prediction system 109 may comprise a computing device that is configured to receive, store and analyze crime data for the regions identified by the region identifiers 113, and produce a set of crime analysis data 111 which may include a prediction of crimes in a respective region based on historical data, crime statistics, historical radio usage (e.g. radios at the devices 103), and the like; the prediction of crimes in a respective region may include a predicted radio busy time for each of the regions and/or a predicted radio idle time for each of the regions. For example, the crime prediction system 109 may receive crime statistics, including associated radio usage time, for each of a plurality of regions from the server 101, and generate a predicted radio busy time for each of the regions and/or a predicted radio idle time for each of the regions. In some embodiments, the server 101 may be further configured to track radio busy time and/or radio idle time for each region and/or for channels for each region and/or for talkgroups for each region, and provide such data to the crime prediction system 109, which responsively generates the crime analysis data 111 for each region.

Furthermore, the crime analysis data 111 may be generated as a function of time. For example, an historical radio busy time and/or radio idle time may change with a time of day, a day of the week, weekends, weekdays, holidays, a dispatch shift schedule and the like.

Furthermore, when the crime analysis data 111 initially includes a history of types of incidents for given regions and/or probabilities of types of incidents occurring, as a function of time, without an associated radio busy time and/or an associated radio idle time, the crime prediction system 109 may be configured to determine an associated radio busy time and/or an associated radio idle time by: assigning a predetermined radio busy time and/or an predetermined associated radio idle time to an incident type, and/or assigning a weighted radio busy time and/or a weighted associated radio idle time as a function of incident type and/or according to the probability of an incident type occurring. For example, a homicide incident may be weighted higher than a mugging incident, but may have a lower probability of occurring; put another way, a severity level of an incident may be designated and higher severity level incidents, such as homicides, may be associated with more radio busy time (and/or less radio idle time) than a lower severity incident, though higher severity level incidents may have a lower probability of occurring than lower severity level incidents, which may reduce a predicted radio busy time.

Alternatively, such a determination of a radio busy time and/or a radio idle time for incidents may occur at the server 101, as described in more detail below.

In yet further embodiments, the crime analysis data 111 may be generated and/or provides and/or tracked as a function of first responders, for example the first responders depicted in FIG. 2. For example, the crime analysis data 111 may be generated for each of the first responders depicted in FIG. 2 and associated with respective identifiers thereof. In these embodiments, the crime analysis data 111 may comprise historical radio busy times and/or idle times of a respective first responder as a function of time, and/or a list of incidents and/or incident types to which the respective first responder was dispatched.

Figure 3:
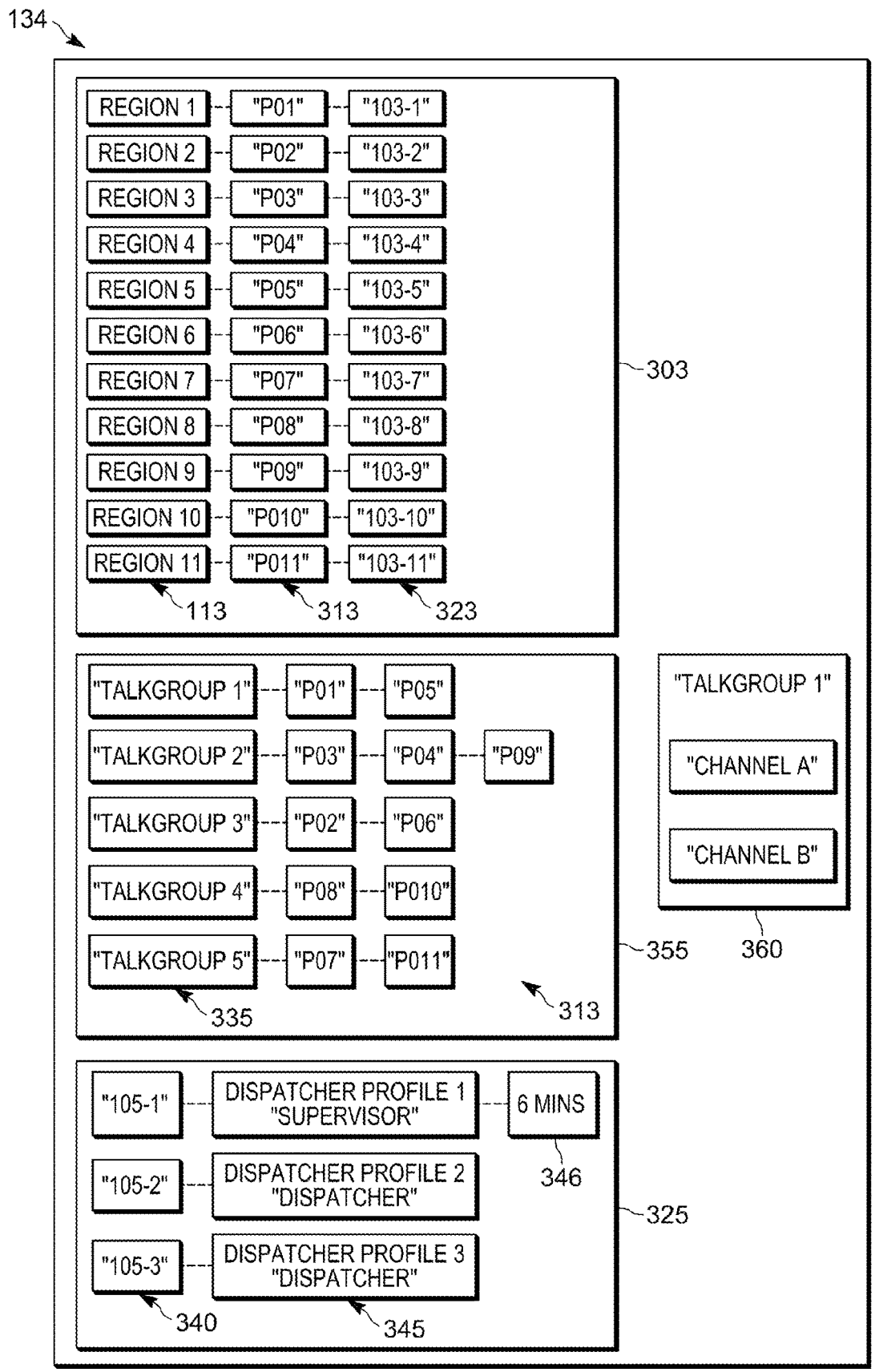
FIG. 3 is a block diagram of a memory of a server in the system of FIG. 1 in accordance with some embodiments.

Attention is next directed to FIG. 3 which depicts an example of the data 134 stored at the memory 122. In particular, the data 134 includes a mapping 303 of the region identifiers 113 of the regions of the map 200 to identifiers 313 of the currently assigned first responders, as well as respective identifiers 323 of assigned devices 103. For example, the first responder having an identifier "P01" has been assigned to "Region 1" and is using the device 103-1.

It is further understood that while present example embodiments are described with respect to one responder assigned to a region, more than one responder may be assigned to a region (and/or more than one device 103).

The data 134 further comprises a mapping 325 of identifiers 340 of each of the dispatcher terminals 105 to respective dispatcher profiles 345 of dispatchers presently assigned to the dispatcher terminals 105. For example, dispatcher terminal 105-1 is currently being operated by a dispatcher having a "Dispatcher Profile 1". Furthermore, each of the dispatcher profiles 345 include an indication of seniority of a respective dispatcher. For example, as depicted, the dispatcher defined by the "Dispatcher Profile 1" is a "Supervisor" and is hence senior to the dispatchers defined by the "Dispatcher Profile 2" and the "Dispatcher Profile 3" who have a seniority level of "Dispatcher" and are hence junior to the "Supervisor" dispatcher defined by the "Dispatcher Profile 1". Alternatively, such dispatcher profiles may include indications of one or more of a role, a knowledge level, and the like, of a dispatcher.

In the depicted example, the dispatcher identified by "Dispatcher Profile 1" is further associated with a time period 346 which provides an estimate of an amount of time that the dispatcher identified by "Dispatcher Profile 1" will spend each hour on supervisor duties, in addition to operating the dispatcher terminal 105-1. While as depicted, the time period 346 may be provided as a number of minutes per hour (e.g. "6 Mins", or six minutes) that a supervisor dispatcher, and the like, spends on supervisory duties, the time period 346 may be provided in any suitable format including, but not limited to a percentage of time a supervisor dispatcher may spend on supervisory duties and/or responsibilities and the like.

While the other dispatcher profiles 345 do not include a time period similar to the time period 346, in other embodiments, any of the dispatcher profiles 345 may include such time periods depending, for example, on their seniority, role, knowledge level, and the like.

Alternatively, one or more of the dispatcher profiles 345 may include responsibilities of dispatchers associated with the plurality of dispatcher terminals 105, with such responsibilities each associated with a given time period, similar to the time period 346; addition of such given time periods may occur when determining estimate of an amount of time that each dispatcher will spend each hour on their respective duties.

The data 134 further comprises an assignment 355 of talkgroups to the various first responders, the talkgroups identified by respective talkgroup identifiers 335, and the first responders identified by the identifiers 313. As depicted there are five talkgroups having talkgroup identifiers 335 "Talkgroup1", "Talkgroup2", etc. However, there may be more than five talkgroups or fewer than five talkgroups. In general, the first responders may be organized into talkgroups based on relationships between the first responders, the regions where the first responders are deployed, and the like.

For example, as depicted: the first responders having the identifiers 313 of "P01" and "P05" are assigned to the talkgroup having a talkgroup identifier 335 of "Talkgroup1"; the first responders having the identifiers 313 of "P03", "P04" and "P09" are assigned to the talkgroup having a talkgroup identifier 335 of "Talkgroup2"; the first responders having the identifiers 313 of "P02" and "P06" are assigned to the talkgroup having a talkgroup identifier 335 of "Talkgroup3"; the first responder having the identifiers 313 of "P08" and "P010" are assigned to the talkgroup having a talkgroup identifier 335 of "Talkgroup4"; and the first responders having the identifiers 313 of "P07" and "P011" are assigned to the talkgroup having a talkgroup identifier 335 of "Talkgroup5".

While the assignment of talkgroups is depicted with respect to assignment of first responder identifiers 313 to given talkgroups, the assignment of talkgroups may alternatively be with respect to assignment of communication device identifiers 323 to given talkgroups (e.g. the devices 103 that are assigned to the first responders as indicated in the mapping 303).

As described above, a talkgroup generally comprises a plurality of channels, including, but not limited to, logical channels, over which devices may communicate. Hence, for example, while talkgroups may be defined in terms of a group of devices and/or radios, underlying such talkgroups are one or more channels used to communicate in a talkgroup. In the depicted example, the data 234 further shows a mapping 360 of the talkgroup identified by "Talkgroup1" to two channels identified by "Channel A" and "Channel B". While only the channel mapping 360 for the "talkgroup identified by "Talkgroup1" is depicted, the data 134 may store channel mappings for all the talkgroups. Furthermore, such a channel mapping 360 may be dynamic, with assigned channels increased or decreased as activity on a talkgroup increases or decreases.

In other embodiments, the data 134 may alternatively comprise an assignment 355 of channels to the various first responders. Either way, it is generally understood that in present embodiments, assignment of channels to the dispatcher terminals 105 may occur by assigning talkgroups to the dispatcher terminals 105. Indeed, herein the terms "channel" and "talkgroup" may be used interchangeably, at least with respect to generating predicted dispatcher workloads associated channels and/or talkgroups and assigning channels and/or talkgroups to the dispatcher terminals 105.

Figure 4:
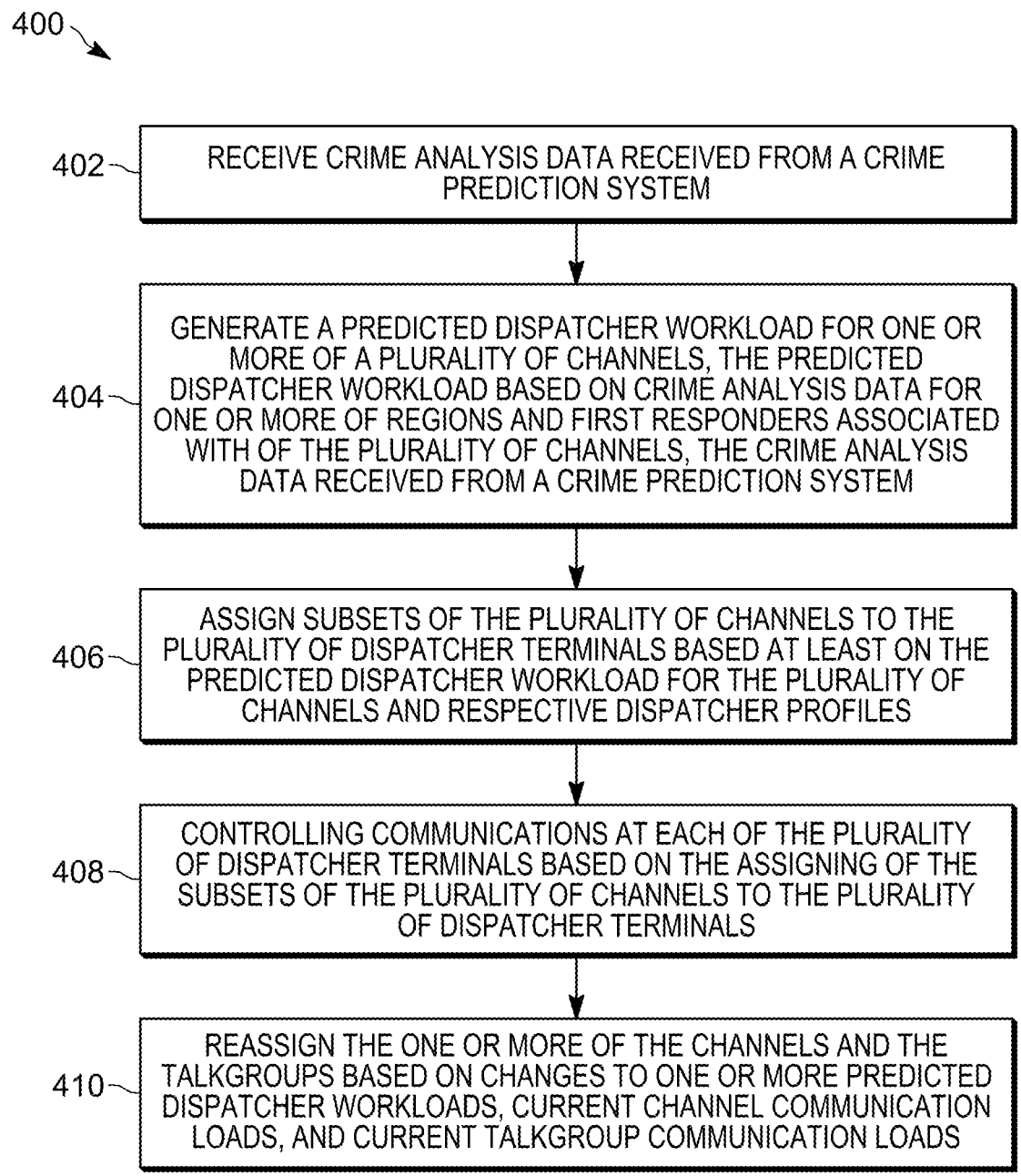
FIG. 4 is a flowchart of a method for balancing resource usage at a plurality of computing terminals in accordance with some embodiments.

Attention is now directed to FIG. 4 which depicts a flowchart representative of a method 400 for balancing resource usage at a plurality of computing terminals. In some embodiments, the operations of the method 400 of FIG. 4 correspond to machine readable instructions that are executed by, for example, the server 101 of FIG. 1, and specifically by the controller 120 of the server 101. In the illustrated example, the instructions represented by the blocks of FIG. 4 are stored at the memory 122, for example, as the application 123. The method 400 of FIG. 1 is one way in which the system 100 and/or the server 101 and/or the controller 120 is configured. Furthermore, the following discussion of the method 400 of FIG. 4 will lead to a further understanding of the server 101, and its various components.

However, it is to be understood that the system 100 and/or the server 101 and/or the controller 120 and/or the method 400 may be varied, and need not work exactly as discussed herein in conjunction with each other, and that such variations are within the scope of present embodiments.

Furthermore, the method 400 of FIG. 4 need not be performed in the exact sequence as shown and likewise various blocks may be performed in parallel rather than in sequence. Accordingly, the elements of method 400 are referred to herein as "blocks" rather than "steps".

At a block 402, the controller 120 receives crime analysis data 111 from the crime prediction system 109 for one or more of regions and first responders associated with of one or more of the channels and talkgroups.

At a block 404, the controller 120 generates a predicted dispatcher workload for one or more of channels and talkgroups, the predicted dispatcher workload based on the crime analysis data 111.

At a block 406, the controller 120 assigns subsets of the one or more of the channels and the talkgroups to the plurality of dispatcher terminals 105 based at least on the predicted dispatcher workload for one or more of the channels and the talkgroups and the respective dispatcher profiles 345.

At a block 408, the controller 120 controls communications at each of the plurality of dispatcher terminals 105 based on the assigning of the subsets of the one or more of the channels and the talkgroups to the plurality of dispatcher terminals 105.

At a block 410, the controller 120 may reassign the one or more of the channels and the talkgroups, for example, periodically, based on one or more of: changes to one or more predicted dispatcher workloads, current channel communication loads, current talkgroup communication loads. Such a reassignment may include again executing the blocks 404, 406, 408.

Example embodiments of the method 400 are now described with reference to FIG. 5 to FIG. 10, each of which are substantially similar to FIG. 1, with like elements having like numbers. Furthermore, while the method 400 will be described with respect to assigning talkgroups to the dispatcher terminals 105, channels may alternatively be assigned to the dispatcher terminals 105, and/or a combination of channels and talkgroups may be assigned to the dispatcher terminals 105.

Figure 5:
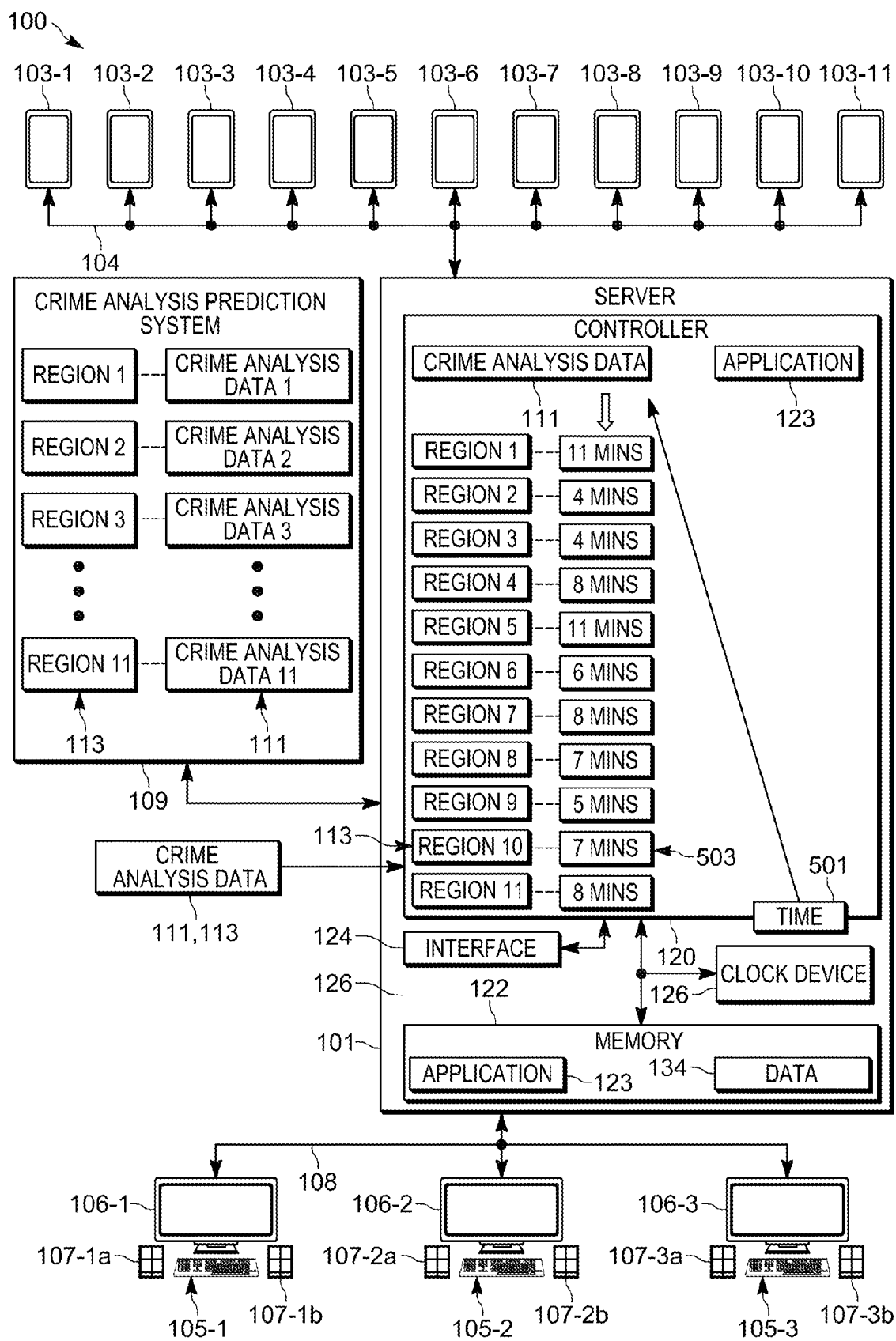
FIG. 5 depicts the server of the FIG. 1 generating predicted dispatcher workload for a plurality of regions in accordance with some embodiments.

Attention is next directed to FIG. 5, which depicts a particular example embodiment of block 402 of the method 400. In FIG. 5, the controller 120 is executing the application 123, and the server 101 and/or the controller 120 is receiving the crime analysis data 111, as well as the region identifiers 113, from the crime prediction system 109. The crime analysis data 111 may be provided periodically and/or automatically by the crime prediction system 109 and/or upon request by the server 101. While not depicted, the server 101 may further (e.g. periodically and/or upon request) send crime data (e.g. radio busy/idle times for regions and/or first responders, incidents for regions and/or first responders, and the like) to the crime prediction system 109 for analysis such that the crime prediction system 109 may update the crime analysis data 111.

When the crime prediction system 109 is a component of the server 101, the block 402 of the method 400 may comprise the controller 120 accessing the crime analysis data 111 stored, for example, at the memory 122.

As described above, the crime analysis data 111 may be time dependent; hence, in FIG. 5, the controller 120 is also receiving a current time 501 from the clock device 126, and extracting and/or generating predicted radio busy times 503 for each region identified by the region identifiers 113. For example, when the current time 501 indicates 8 am on a Monday morning (which could also be in a current month, and/or be a holiday), the controller 120 extracts and/or generates predicted radio busy times 503 for each region in a time period that includes 8 am Monday morning (and alternatively, according to a corresponding month and/or holiday).

When the crime analysis data 111 comprises a list of incident types that occur within a time period that includes the current time 501, the controller 120 may generate the predicted radio busy times 503 from the incident types, assuming that the controller 120 has access to a list of incident types with corresponding radio busy times (and alternatively an associated probability of occurrence), which could be provided in the crime analysis data 111 and/or in the application 123.

Either way, the controller 120 generates the predicted radio busy times 503 for each region. As depicted, the predicted radio busy times 503 comprise a number of minutes that a dispatcher and/or a first responder may spend using a dispatcher terminal 105 and/or a radio of a device 103, to communicate in an hour, according to historical crime data. Alternatively, the controller 120 may generate predicted radio idle times comprising comprise a number of minutes that a dispatcher terminal 105 and/or a radio of a device 103 is idle from communications in an hour, according to historical crime data. However, any suitable parameter that may be used to predict dispatcher workload is within the scope of the present specification.

Predicted radio busy times will be used hereafter as an example, but may be replaced with any suitable parameter. In particular, in FIG. 5, the "Region 1" is associated with "11 Mins", or 11 minutes of radio busy time in an hour; hence, in this example "Region 1" is predicted to have 11 minutes of radio busy time in an hour. Put another way, a dispatcher monitoring a talkgroup that includes a device 103 and/or a first responder located in "Region 1" is predicted to be busy 11 minutes every hour communicating with the device 103 in "Region 1" using a respective dispatch terminal 105.

Figure 6:
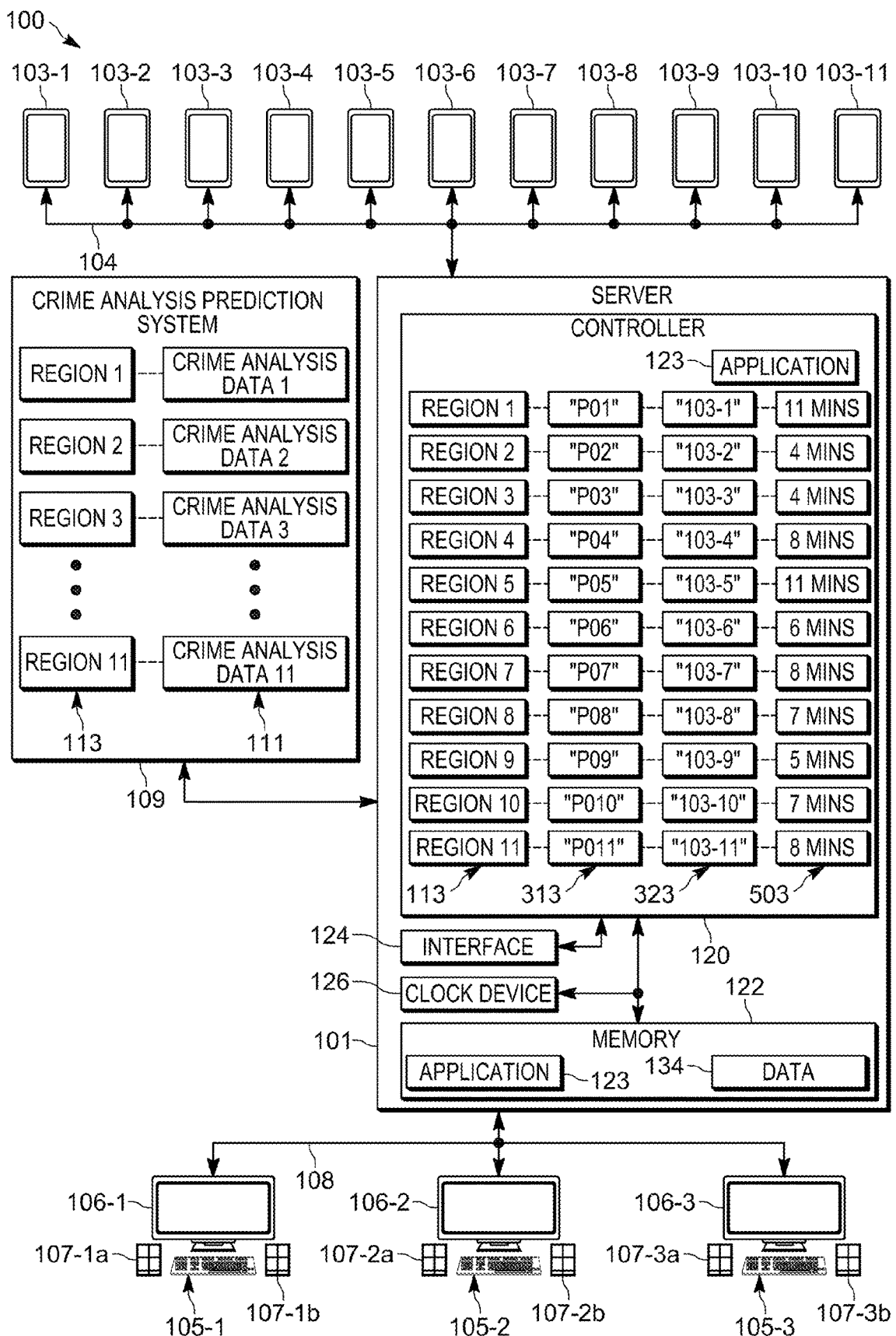
FIG. 6 depicts the server of the FIG. 1 associating the predicted dispatcher workload for the plurality of regions with device identifiers and responder identifiers in accordance with some embodiments.

Attention is next directed to FIG. 6, which depicts a particular example embodiment of a portion of the block 404 of the method 400. In particular, the controller 120 has retrieved the region identifiers 113, the responder identifiers 313 and the device identifiers 323 (e.g. from the mapping 303) from the data 134, and associated the corresponding predicted radio busy times 503 with the responder identifiers 313 and the device identifiers 323, based on the association between the region identifiers and the predicted radio busy times 503 shown in FIG. 5.

Figure 7:
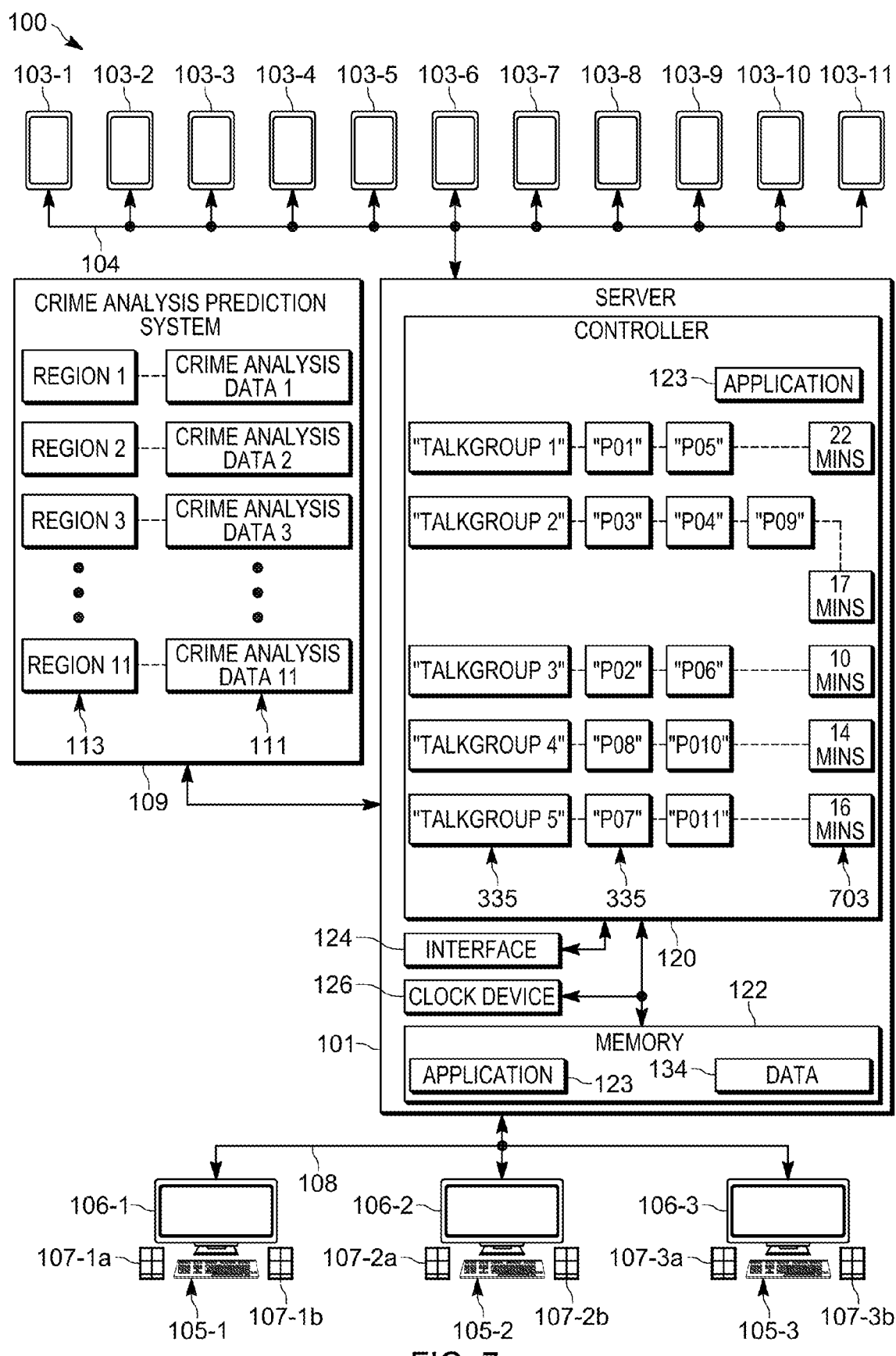
FIG. 7 depicts the server of the FIG. 1 generating predicted dispatcher workload for a plurality of talkgroups and/or channels in accordance with some embodiments.

Attention is next directed to FIG. 7, which depicts a particular example embodiment of a further portion of the block 404 of the method 400. In particular, the controller 120 has retrieved the talkgroup identifiers 335 and the first responder identifiers 313 (e.g. the assignment 355) from the data 134, and summed the predicted radio busy times 503 for each talkgroup identified by the talkgroup identifiers 335, as total predicted radio busy times 703, according to the assignment of first responders to each talkgroup, and the association between the predicted radio busy times 503 and the responder identifiers 313 depicted in FIG. 6.

Hence, for example, the talkgroup "Talkgroup1" associated with first responders "P01", "P05", has a total predicted radio busy time of 22 minutes, or a sum of the predicted radio busy time of 11 minutes for each of first responders "P01", "P05" and/or each region "Region 1", "Region 2" (i.e. with reference to FIG. 6). Put another way, a dispatcher monitoring "Talkgroup1" is predicted to be busy 22 minutes every hour.

Similarly, for example, the talkgroup "Talkgroup2" associated with first responders "P03", "P04", "P09" has a total predicted radio busy time of 17 minutes, or a sum of the predicted radio busy time of 4 minutes, 8 minutes and 9 minutes, respectively, for the first responders "P03", "P04", "P09" and/or each region "Region 3", "Region 4", "Region 9" (i.e. with reference to FIG. 6). Put another way, a dispatcher monitoring "Talkgroup2" is predicted to be busy 17 minutes every hour.

Similarly, for example, the talkgroup "Talkgroup3" associated with first responders "P02", "P06" has a total predicted radio busy time of 10 minutes, or a sum of the predicted radio busy time of 4 minutes, and 6 minutes, respectively, for the first responders "P02", "P06" and/or each region "Region 2", "Region 6" (i.e. with reference to FIG. 6). Put another way, a dispatcher monitoring "Talkgroup3" is predicted to be busy 10 minutes every hour.

Similarly, for example, the talkgroup "Talkgroup4" associated with first responders "P08", "P010" has a total predicted radio busy time of 14 minutes, or a sum of the predicted radio busy time of 7 minutes, and 7 minutes, respectively, for the first responders "P08", "P010" and/or each region "Region 8", "Region 10" (i.e. with reference to FIG. 6). Put another way, a dispatcher monitoring "Talkgroup4" is predicted to be busy 14 minutes every hour.

Similarly, for example, the talkgroup "Talkgroup5" associated with first responders "P07", "P011" has a total predicted radio busy time of 16 minutes, or a sum of the predicted radio busy time of 8 minutes, and 8 minutes, respectively, for the first responders "P07", "P011" and/or each region "Region 7", "Region 11 (i.e. with reference to FIG. 6). Put another way, a dispatcher monitoring "Talkgroup5" is predicted to be busy 16 minutes every hour.

Hence, FIG. 6 and FIG. 7 together depict an example embodiment of the block 404 in that controller 120 generates a predicted dispatcher workload, as defined by the total predicted radio busy times 703, for one or more of the channels and the talkgroups (e.g. as represented by a plurality of talkgroups), the predicted dispatcher workload based on the crime analysis data 111.

Figure 8:
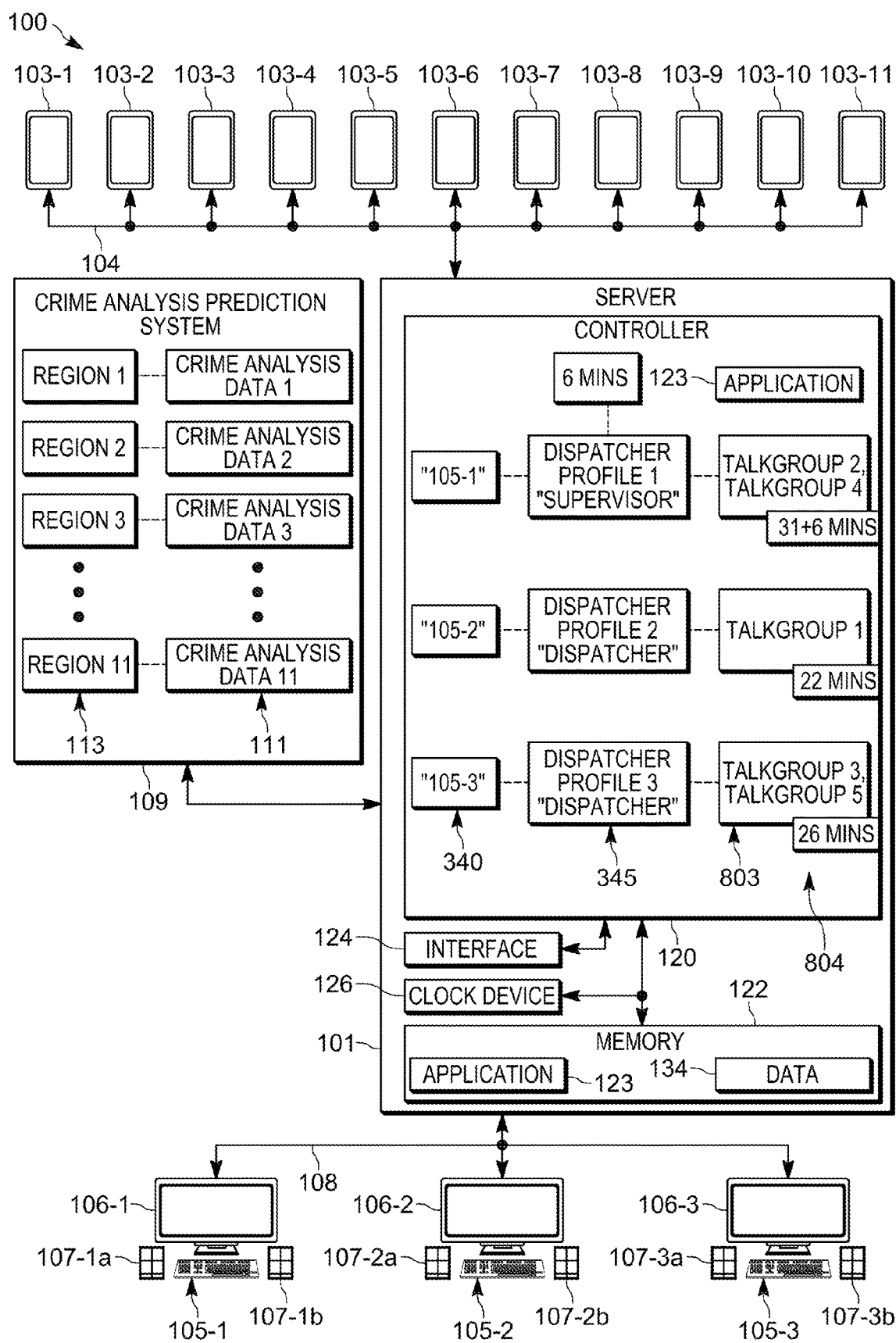
FIG. 8 depicts the server of the FIG. 1 assigning talkgroups to dispatcher terminals based on the predicted dispatcher workload for a plurality of talkgroups and/or channels and respective dispatcher profiles in accordance with some embodiments.

Attention is next directed to FIG. 8 which depicts an example embodiment of the block 406 of the method 400. In particular, the controller 120 has retrieved the dispatcher terminal identifiers 340 and the dispatcher profiles 345 (e.g. the assignment 355) from the data 134 (e.g. the mapping 325) from the data 134. In FIG. 8, the controller 120 is assigning subsets of one or more of the channels and the talkgroups, as represented by the talkgroups, to the plurality of dispatcher terminals 105 based at least on the predicted dispatcher workload, defined by the total predicted radio busy times 703, for one or more of the channels and the talkgroups and respective dispatcher profiles 345.

In some embodiments, the controller 120 assigns the talkgroups identified by the talkgroup identifiers 335 to about evenly distribute the predicted dispatcher workload among the dispatcher terminals 105, for example when each dispatcher has the same title and/or responsibilities and/or is about evenly weighted. In these embodiments, as there are three dispatcher terminals 105, the controller 120 assigns the talkgroups identified by the talkgroup identifiers 335 into groups of three, and in various combinations, until sums of the total predicted radio busy times 703 for each of the three groups of talkgroups are similar and/or about equal. Put another way, the assigning, at the server 101, subsets of a plurality of talkgroups and/or channels to the plurality of dispatcher terminals 105 may occur such that each of the plurality of dispatcher terminals 105 is associated with similar respective total predicted dispatcher workloads.

However, as in the depicted embodiment the dispatcher having the "Dispatcher Profile 1" is a "Supervisor", and the controller 120 is configured to assign a predicted dispatcher workload to the associated dispatcher terminal 105-1 by a given amount, for example 30%. In other words, the "Supervisor" dispatcher operating the dispatcher terminal 105-1 may be assigned talkgroups that results in the dispatcher terminal 105-1 having a predicted dispatcher workload about 30% higher than the other dispatcher terminals 105-2, 105-3. Furthermore, such a predicted dispatcher workload includes the time period 346 of 6 minutes every hour that the "Supervisor" dispatcher may spend on supervisory duties.

Hence, as depicted, the dispatcher terminal 105-1 has an assignment 803 of the talkgroups "Talkgroup2" and "Talkgroup4", having a summed total predicted radio busy time of 31 minutes. However, the predicted dispatcher workload

804 associated with the dispatcher terminal 105-1 is 37 minutes: e.g. the summed total predicted radio busy time of 31 minutes plus the time period 346 of 6 minutes.

Assignment of talkgroups to the other dispatcher terminals 105-2, 105-3 occurs to about evenly distribute the remaining talkgroups therebetween, based on the predicted dispatcher workloads as defined by the total predicted radio busy times 703. As depicted, the dispatcher terminal 105-2 has an assignment 803 of the talkgroup "Talkgroup1" having a predicted dispatcher workload 804 (e.g. total predicted radio busy time) of 22 minutes, and dispatcher terminal 105-3 has an assignment 803 of the talkgroups "Talkgroup3 and "Talkgroup5" having a predicted dispatcher workload 804 (e.g. total predicted radio busy time) of 26 minutes.

While in the present examples, a particular set of parameters is used for assigning talkgroups (and/or channels) to the dispatcher terminals 105, such assignment may include, but is not limited to: assigning subsets of a plurality of talkgroups and/or channels to the plurality of dispatcher terminals 105, based on: the predicted dispatcher workload for the plurality of talkgroups and/or channels; and one or more of: responsibilities of dispatchers associated with the plurality of dispatcher terminals 105, as stored in the memory 122 (e.g. in the data 134); seniority of the dispatchers associated with the plurality of dispatcher terminals 105, as stored in the memory 122 (e.g. in the data 134); and a weighting of the crime analysis data 111, for example according to incident type.

In yet further embodiments, talkgroups (and/or channels) may be further assigned to minimize a number of talkgroups assigned to each dispatcher terminal 105 and/or to maximize a predicted dispatcher workload per assigned talkgroup at each dispatcher terminal 105. For example, human factors suggest that a dispatcher may be more responsive when one talkgroup associated with a predicted dispatcher workload of 25 minutes is assigned to an associated dispatch terminal 105, as compared to when 5 talkgroups are assigned to an associated dispatch terminal with 5 minutes each of predicted dispatcher workload.

In yet further embodiments, talkgroups (and/or channels) may be further assigned to minimize a chance of incidents overlapping with multiple dispatcher terminals 105. For example, the crime analysis data 111 may indicate that some regions identified by the region identifiers 113 have a higher rate of incidents and/or given types of incidents occurring than other regions. For example, Region 1 and Region 2 may have higher incidents of homicides, than the other regions; as homicide incidents tend to result in a given dispatch terminal 105 assigned to the incident being very busy for the period of time of the incident, the controller 120 may prevent a single dispatch terminal 105 being assigned to talkgroups (and/or channels) associated with both Region 1 and Region 2.

Figure 9:
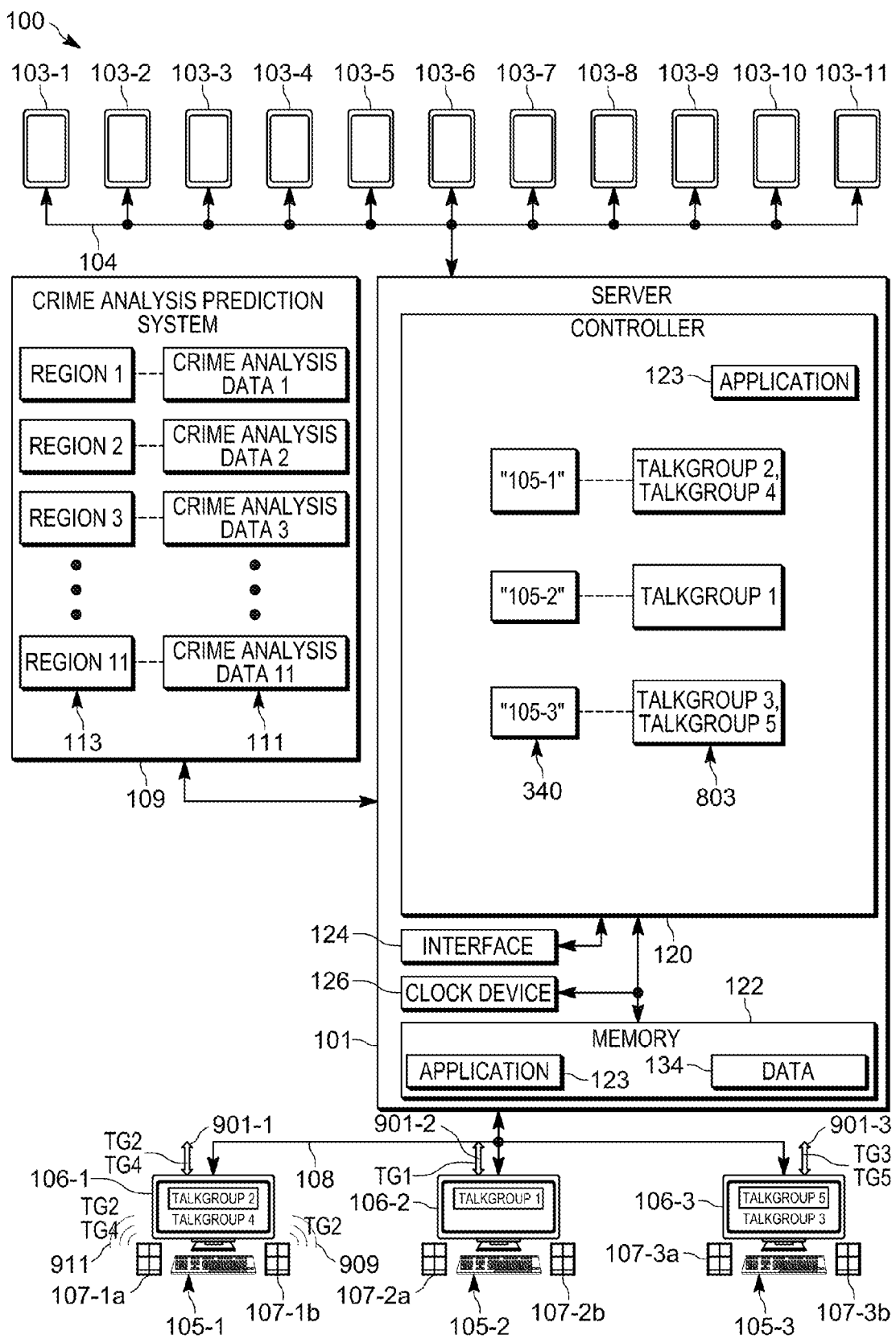
FIG. 9 depicts the server of the FIG. 1 controlling communications at the dispatcher terminals based on based on the assigning of the subsets of the plurality of talkgroups to the plurality of dispatcher terminals in accordance with some embodiments.

Attention is next directed to FIG. 9 which depicts an example embodiment of the block 408 of the method 400. In particular, the controller 120 continues to track the assignment 803 of talkgroups to the dispatcher terminal identifiers 340 of the dispatcher terminals 105, and, as depicted, is controlling communications at each of the plurality of dispatcher terminals 105 based on an assigning of a subset of one or more of the channels and the talkgroups to the plurality of dispatcher terminals 105, as represented by the assignment of talkgroups to the dispatcher terminals 105.

For example, as depicted, communications 901-1 over the links 108 between the dispatcher terminal 105-1 and the server 101, is controlled to be over the talkgroups "Talkgroup2" and "Talkgroup4" (labelled "TG2, TG4"), as well the associated devices 103. Similarly, communications 901-2 over the links 108 between the dispatcher terminal 105-2 and the server 101, is controlled to be over the talkgroup "Talkgroup1" (labelled "TG1"), as well the associated devices 103. Similarly, communications 901-3 over the links 108 between the dispatcher terminal 105-3 and the server 101, is controlled to be over the talkgroups "Talkgroup3" and "Talkgroup5" (labelled "TG3, TG5"), as well the associated devices 103. Such communications 901 (i.e. the communications 901-1, 901-2, 901-3) may include, but are not limited to, restricting the dispatcher terminals 105 to communicating over assigned talkgroups and/or associated channels, conveying dispatch commands, and the like, over assigned talkgroups and/or associated channels, conveying voice data and/or media, and the like, over assigned talkgroups and/or associated channels etc.

In the depicted example, the controller 120 further controls the display devices 106 at each of the plurality of dispatcher terminals 105 to indicate a respective assigned subset of the plurality of the talkgroups (and/or the assigned channels). For example, as depicted in FIG. 9, at each of the display devices 106, the respective assigned talkgroups indicated as a list of talkgroups, the list provided in an order in which a currently active talkgroup is automatically moved to the top of the list.

A talkgroup (and/or channel) may be designated as currently active when the talkgroup is currently being used to communicate with a device 103 (e.g. when a dispatcher is using a dispatcher terminal 105 to talk using a respective talkgroup, the talkgroup may be designated as frozen).

In some embodiments, a respective talkgroup may be selected as currently active by a respective dispatcher using, for example, an input device to select text corresponding to a talkgroup at a display device 106. For example, at the dispatcher terminal 105-1, the talkgroup "Talkgroup2" has been selected (as indicated by the box around the respective text, as well as the talkgroup "Talkgroup2" being first in the list of the talkgroups "Talkgroup2", "Talkgroup4" at the display device 106-1) and hence is a presently active talkgroup; for example, sound received at an associated microphone may be transmitted over the talkgroup "Talkgroup2" and not the talkgroup "Talkgroup4", though communications over the talkgroup "Talkgroup4" continue to be received.

In the depicted example, the controller 120 further controls one or more speaker devices 107 at each of the plurality of dispatcher terminals 105 based on the assigning of the subsets of one or more of the channels and the talkgroups (e.g. the talkgroups) to the plurality of dispatcher terminals 105 by routing audio communication corresponding to assigned channels (e.g. talkgroups) to a particular dispatcher terminal speaker device 107. For example, continuing with the example of the talkgroup "Talkgroup2" being active at the dispatcher terminal 105-1, the controller 120 controls the speaker device 107-1*b* to output sound 909 corresponding to received communications from the talkgroup "Talkgroup2", and controls the speaker device 107-1*a* to output sound 911 corresponding to received communications from both assigned talkgroups "Talkgroup2", "Talkgroup4". Indeed, a first speaker device 107 at each of the dispatcher terminals 105 may be controlled to output sound corresponding to received communications from a currently active respective assigned talkgroup, and a second speaker device 107 at each of the dispatcher terminals 105 may be controlled to output sound corresponding to received communications from all respective assigned talkgroups.

In some embodiments, (e.g. at the block 410 of the method 400) the channels and/or talkgroups may be reassigned, for example, periodically, based on one or more of: changes to one or more predicted dispatcher workloads, current channel communication loads and current talkgroup communication loads. For example, as the crime analysis data 111 may be a function of time, as a time changes, at least blocks 404, 406, 408 may be executed periodically, for example throughout a shift (e.g. every hour), though such reassignment may be restricted to talkgroups over which no communications are presently occurring, and/or to talkgroups not associated with an incident.

Alternatively, reassignment of the predicted dispatcher workloads based on one or more of: a time of day; a dispatch shift schedule; holidays; a day of a week; a weekend; a respective current location of one or more of the first responders (e.g. when a first responder changes regions); an occurrence of a given incident type; and a change in a number of the plurality of dispatcher terminals currently being operated by dispatchers Indeed, during such reassignment, the controller 120 may be configured to maintain current assignments unless load on a talkgroup (and/or channel) is, for example, above a threshold level. For example, the controller 120 may track current talkgroups communication loads and/or and current talkgroup communication loads and when such loads (e.g. as defined by active radio time on a respective talkgroup and/or channel) are above a threshold level (e.g. such as 10 consecutive active minutes), a reassignment of the talkgroups and/or channels may occur, excluding the talkgroups and/or channels which are above the threshold level, which may be designated as frozen.

Indeed, such reassignment may exclude currently active channels and/or talkgroups, for example channels and/or talkgroups over which active communications are currently occurring, as described above. Similarly, such reassignment may exclude one or more frozen talkgroups and/or one or more frozen channels; for example, the one or more frozen talkgroups and/or the one or more frozen channels are selected from the plurality of talkgroups and/or a plurality of channels, based on one or more of: communication activity of the plurality of talkgroups and/or channels (e.g. above a threshold level); and a location of a talkgroup and/or channel in an order of a respective subset of the plurality of the talkgroups and/or channels assigned to a respective dispatcher terminal 105, the order based on the communication activity in the respective subset; and an incident associated with a talkgroup and/or channel. For example, as depicted, at the dispatcher terminal 105-1, the talkgroup "Talkgroup2" is currently active and hence may be designated as a frozen talkgroup (and any channels in the talkgroup are similarly frozen); similarly, at the dispatcher terminal 105-3, the talkgroup "Talkgroup5" is currently active (as it is at the top of a respective list of talkgroups rendered at the display device 106-3) and hence may be designated as a frozen talkgroup (and any channels in the talkgroup are similarly frozen. When such a list of talkgroups (and/or channels) include three or more talkgroups (and/or channels), a given number of talkgroups at the top of the list may be designated as frozen; for example, in a list of ten talkgroups, the top three talkgroups may be designated as frozen, and excluded from reassignment to other dispatcher terminals 105.

Figure 10:
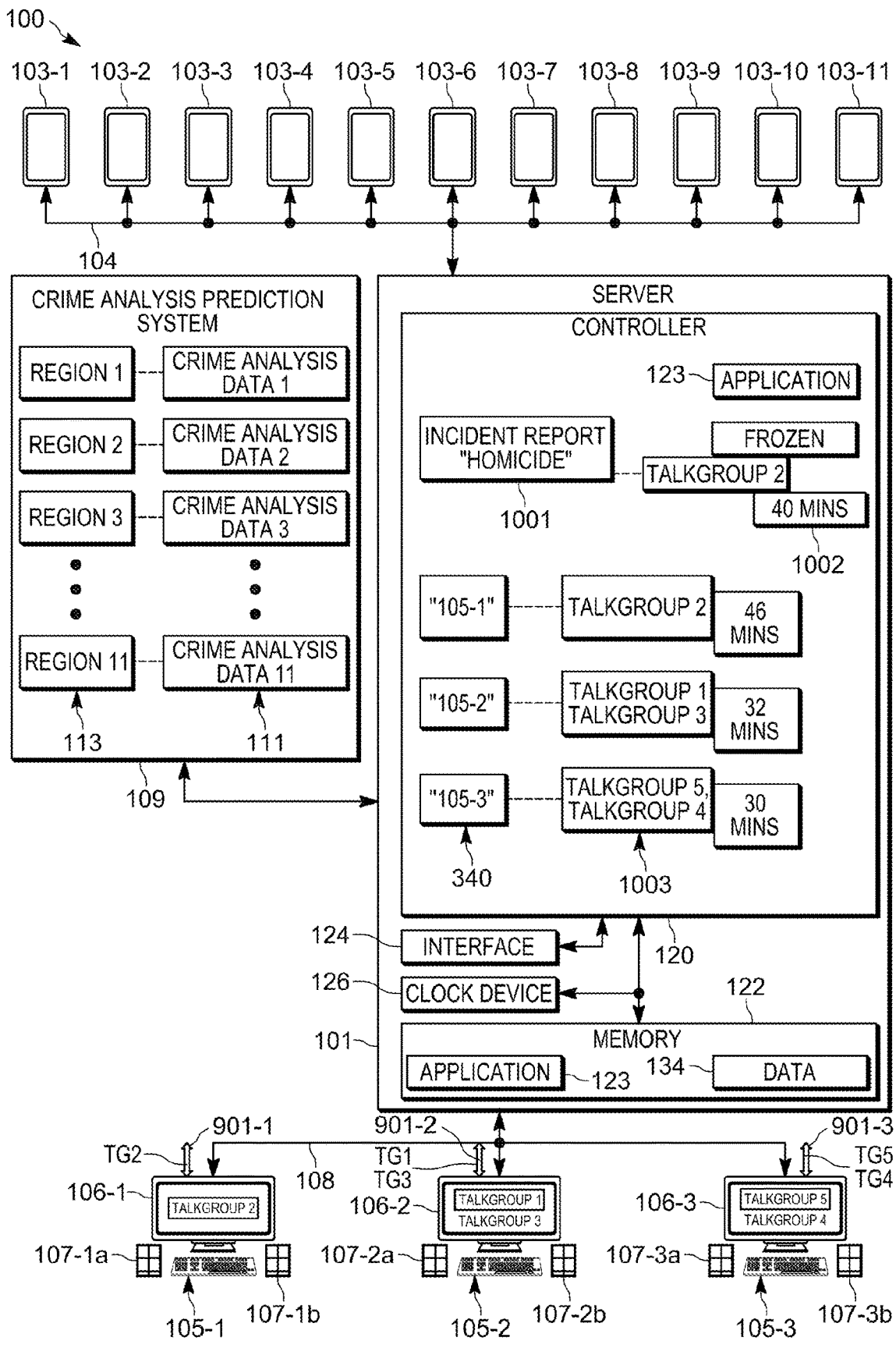
FIG. 10 depicts the server of the FIG. 1 reassigning talkgroups to dispatcher terminals based on changed predicted dispatcher workload for a plurality of talkgroups and/or channels and respective dispatcher profiles in accordance with some embodiments.

Furthermore, reassigning talkgroups to the dispatcher terminals 105 when the talkgroups are dynamic, and the number of talkgroups changes. In other words, a talkgroup may go off-line if not active, and may come back on-line when a first responder activates a push-to-talk key at a communication device 103. A talkgroup going off-line may result in reassigning the remaining talkgroups while excluding the off-line talkgroup, and a talkgroup coming on-line may result in reassigning the talkgroups including the on-line talkgroup Attention is next directed to FIG. 10 which depicts an example embodiment of the block 410 of the method 400, and specifically an example of reassigning talkgroups to the dispatcher terminals 105. In FIG. 10, an incident report 1001 has been received at the server 101, for example from a 911 call center and the like, indicating that an incident type of a "Homicide" has occurred in a region associated with the talkgroup "Talkgroup2". The controller 120 may be configured to change a predicted dispatcher workload 1002 of a talkgroup based on an associated incident type, as depicted "40 Mins" for the homicide associated with the talkgroup "Talkgroup2", and further designate the associated talkgroup "Talkgroup2" as "Frozen".

The receipt of such an incident report and/or the change in the predicted dispatcher workload of the talkgroup "Talkgroup2" and/or the designation of the talkgroup "Talkgroup2" as "Frozen" may cause the controller 120 to again implement the blocks 404, 406, 408 of the method 400, excluding the frozen talkgroup "Talkgroup2" from the reassigning. In other words, during the reassigning the frozen talkgroup "Talkgroup2" remains assigned to the dispatcher terminal 105-1. Similarly, as the talkgroups "Talkgroup1", "Talkgroup5" may be designated as frozen at their respective dispatcher terminals 105-2, 105-3, as each of the talkgroups "Talkgroup1", "Talkgroup5" are located at the top of a respective list of talkgroups, as provided at the display device 106-2, 106-3, and/or are presently active.

When the talkgroups "Talkgroup1", "Talkgroup2", "Talkgroup5" are frozen, and hence remain assigned to their respective dispatcher terminals 105, only the talkgroups "Talkgroup3", "Talkgroup4" are available to be reassigned. Returning to FIG. 10, The controller 120 updates the assignments 1003 of talkgroups to dispatcher terminals 105 and assigns the talkgroups "Talkgroup3", "Talkgroup4" to balance the predicted dispatcher workload between the dispatcher terminals 105-2, 105-3, such that the dispatcher terminal 105-1 has an associated predicted dispatcher workload that is at least about 30% higher than the dispatcher terminals 105-2, 105-3, as the dispatcher terminal 105-1 is associated with a "Supervisor". With brief reference to FIG. 7, this results in the dispatcher terminal 105-2 having a predicted dispatcher workload of "22 Mins" (e.g. for the talkgroup "Talkgroup1") plus "10 Mins" (e.g. for the talkgroup "Talkgroup3"), for a total of 32 minutes, and further results the dispatcher terminal 105-3 having a predicted dispatcher workload of "14 Mins" (e.g. for the talkgroup "Talkgroup4") plus "16 Mins" (e.g. for the talkgroup "Talkgroup5"), for a total of 30 minutes. Returning to FIG. 10, the dispatcher terminal 105-1 is assigned only the talkgroup "Talkgroup2" with a current predicted dispatcher workload of 46 minutes: the predicted dispatcher workload of "40 Mins" (e.g. for the talkgroup "Talkgroup2", adjusted for the associated incident) plus the time period 346. As this time is already more than 30% higher than each of the other two dispatcher terminals 105-2, 105-3, no other talkgroups are assigned to the dispatcher terminal 105-1.

Furthermore, the time in any predicted dispatcher workload may generally be capped at 60 minutes (e.g. per hour). Indeed, in some embodiments, the controller 120 may be further configured to determine a number of dispatcher terminals 105 for the predicted dispatcher workload. For example, when an average predicted dispatcher workload for the dispatcher terminals 105 (e.g. for a shift) exceeds a threshold predicted dispatcher workload (for example 40 minutes), the controller 120 may generate a recommendation that more dispatcher terminals 105 (e.g. and associated dispatchers) be added to the shift to prevent work overload, and/or to prevent, and/or reduce the likelihood of, any predicted dispatcher workload from exceeding 60 minutes due, for example, to incidents that may occur during a shift. Alternatively, the controller 120 may be configured to determine a minimum number of dispatcher terminals 105 for a shift, for example based on a total predicted dispatcher workload divided by a threshold predicted dispatcher workload.

In the present specification, a system, device and method for balancing resource usage at a plurality of computing terminals is provided to both balance usage of resources and/or communications at dispatcher terminals of a dispatch center, as well as to reduce a likelihood of dispatchers being overwhelmed, or underutilized. Hence, the present specification is also directed towards balancing of human resources and indeed, may be used in conjunction with a human resource computing system which tracks human resource usage: for example, the workloads at each of the described dispatch terminals may be periodically reported to such a human resource computing system, which may analyze the workloads to check that that human resources are being deployed effectively; adjustment to supervisory duties and/or dispatcher duties may be adjusted accordingly in increase, or decrease the predicted times associated with each dispatcher profile that indicate time spent on supervisory duties and/or dispatcher duties.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of at least two items X, Y, and Z (e.g., XYZ, XY, YZ, XZ, and the like). Similar logic may be applied for at least two items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method for controlling communications at a plurality of dispatcher terminals in communication with a computing device, the method comprising:
generating, at the computing device, a predicted dispatcher workload for one or more of channels and talkgroups, the predicted dispatcher workload based on crime analysis data for one or more of regions and first responders associated with the one or more of the channels and the talkgroups, the crime analysis data received from a crime prediction system;
assigning, at the computing device, subsets of the one or more of the channels and the talkgroups to the plurality of dispatcher terminals based at least on the predicted dispatcher workload for the one or more of the channels and the talkgroups and respective dispatcher profiles; and
controlling, at the computing device, communications at each of the plurality of dispatcher terminals based on the assigning of the subsets of the one or more of the channels and the talkgroups to the plurality of dispatcher terminals.

2. The method of claim 1, wherein the assigning, at the computing device, the subsets of the one or more of the channels and the talkgroups to the plurality of dispatcher terminals occurs such that each of the plurality of dispatcher terminals is associated with similar respective total predicted dispatcher workloads.

3. The method of claim 1, further comprising: reassigning, at the computing device, the predicted dispatcher workloads based on one or more of: changes to one or more predicted dispatcher workloads; current channel communication loads; and current talkgroup communication loads.

4. The method of claim 1, further comprising: reassigning, at the computing device, the predicted dispatcher workloads based on one or more of: a time of day; a dispatch shift schedule; holidays; a day of a week; a weekend; a respective current location of one or more of the first responders; an occurrence of a given incident type; and a change in a number of the plurality of dispatcher terminals currently being operated by dispatchers.

5. The method of claim 1, further comprising: reassigning, at the computing device, the predicted dispatcher workloads, the reassigning excluding one or more frozen channels.

6. The method of claim 5, wherein the one or more frozen channels are selected from the one or more of the channels and the talkgroups, based on one or more of: communication activity of the one or more of the channels and the talkgroups; communication activity of one or more talkgroups; a location of a channel in an order of a respective subset of the one or more of the channels and the talkgroups assigned to a respective dispatcher terminal, the order based on the communication activity in the respective subset; and an incident associated with the channel.

7. The method of claim 1, further comprising: assigning, at the computing device, the subsets of the one or more of the channels and the talkgroups to the plurality of dispatcher terminals in communication with the computing device, based on: the predicted dispatcher workload for the one or more of the channels and the talkgroups; and one or more of: responsibilities of dispatchers associated with the plurality of dispatcher terminals, as stored in a memory; seniority of the dispatchers associated with the plurality of dispatcher terminals, as stored in the memory; and a weighting of the crime analysis data.

8. The method of claim 1, wherein the predicted dispatcher workload for the one or more of the channels and the talkgroups comprises one or more of: a predicted radio busy time for the one or more of the channels and the talkgroups; and a predicted radio idle time for the one or more of the channels and the talkgroups.

9. The method of claim 1, further comprising: controlling one or more speakers at each of the plurality of dispatcher terminals based on the assigning of the subsets of the one or more of the channels and the talkgroups to the plurality of dispatcher terminals by routing audio communication corresponding to assigned channels to a particular dispatcher terminal speaker.

10. The method of claim 1, further comprising: controlling a display device at each of the plurality of dispatcher terminals to indicate a respective assigned subset of the one or more of the channels and the talkgroups.

11. A computing device for controlling communications at a plurality of dispatcher terminals, the computing device comprising:
a controller, and a communication interface configured for communication with the plurality of dispatcher terminals and a crime prediction system, the controller configured to:
generate a predicted dispatcher workload for one or more of channels and talkgroups, the predicted dispatcher workload based on crime analysis data for one or more of regions and first responders associated with the one or more of the channels and the talkgroups, the crime analysis data received from the crime prediction system;
assign subsets of the one or more of the channels and the talkgroups to the plurality of dispatcher terminals based at least on the predicted dispatcher workload for the one or more of the channels and the talkgroups and respective dispatcher profiles; and
control communications at each of the plurality of dispatcher terminals based on assigning of the subsets of the one or more of the channels and the talkgroups to the plurality of dispatcher terminals.

12. The computing device of claim 11, wherein the controller is further configured to: assign the subsets of the one or more of the channels and the talkgroups to the plurality of dispatcher terminals occurs such that each of the plurality of dispatcher terminals is associated with similar respective total predicted dispatcher workloads.

13. The computing device of claim 11, wherein the controller is further configured to: reassign the predicted dispatcher workloads based on one or more of: changes to one or more predicted dispatcher workloads; current channel communication loads; and current talkgroup communication loads.

14. The computing device of claim 11, wherein the controller is further configured to: reassign the predicted dispatcher workloads based on one or more of: a time of day; a dispatch shift schedule; holidays; a day of a week; a weekend; a respective current location of one or more of the first responders; an occurrence of a given incident type; and a change in a number of the plurality of dispatcher terminals currently being operated by dispatchers.

15. The computing device of claim 11, wherein the controller is further configured to: reassign the predicted dispatcher workloads, excluding one or more frozen channels.

16. The computing device of claim 15, wherein the one or more frozen channels are selected from the one or more of the channels and the talkgroups, based on one or more of: communication activity of the one or more of the channels and the talkgroups; communication activity of one or more talkgroups; a location of a channel in an order of a respective subset of the one or more of the channels and the talkgroups assigned to a respective dispatcher terminal, the order based on the communication activity in the respective subset; and an incident associated with the channel.

17. The computing device of claim 11, wherein the controller is further configured to: assign the subsets of the one or more of the channels and the talkgroups to the plurality of dispatcher terminals, based on: the predicted dispatcher workload for the one or more of the channels and the talkgroups; and one or more of: responsibilities of dispatchers associated with the plurality of dispatcher terminals, as stored in a memory; seniority of the dispatchers associated with the plurality of dispatcher terminals, as stored in the memory; and a weighting of the crime analysis data.

18. The computing device of claim 11, wherein the predicted dispatcher workload for the one or more of the channels and the talkgroups comprises one or more of: a predicted radio busy time for the one or more of the channels and the talkgroups; and a predicted radio idle time for the one or more of the channels and the talkgroups.

19. The computing device of claim 11, wherein the controller is further configured to: control one or more speakers at each of the plurality of dispatcher terminals based on assigning of the subsets of the one or more of the channels and the talkgroups to the plurality of dispatcher terminals by routing audio communication corresponding to assigned channels to a particular dispatcher terminal speaker.

20. The computing device of claim 11, wherein the controller is further configured to: control a display device at each of the plurality of dispatcher terminals to indicate a respective assigned subset of the one or more of the channels and the talkgroups.

* * * * *